United States Patent
Lachapelle et al.

(10) Patent No.: US 10,290,303 B2
(45) Date of Patent: May 14, 2019

(54) AUDIO COMPENSATION TECHNIQUES FOR NETWORK OUTAGES

(71) Applicant: Google LLC, Mountain View, CA (US)

(72) Inventors: Serge Lachapelle, Vallentuna (SE); Henrik Lundin, Sollentuna (SE)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 15/246,871

(22) Filed: Aug. 25, 2016

(65) Prior Publication Data

US 2018/0061424 A1 Mar. 1, 2018

(51) Int. Cl.
| | |
|---|---|
| *G10L 19/005* | (2013.01) |
| *G10L 25/87* | (2013.01) |
| *H04L 12/835* | (2013.01) |
| *G10L 21/045* | (2013.01) |
| G10L 25/78 | (2013.01) |
| G10L 25/90 | (2013.01) |

(52) U.S. Cl.
CPC .......... *G10L 19/005* (2013.01); *G10L 21/045* (2013.01); *G10L 25/87* (2013.01); *H04L 47/30* (2013.01); *G10L 25/78* (2013.01); *G10L 25/90* (2013.01)

(58) Field of Classification Search
CPC ........ G10L 19/005; G10L 25/87; H04L 47/30
USPC ........................................................ 704/208
See application file for complete search history.

(56) References Cited

U.S. PATENT DOCUMENTS

| | | | | |
|---|---|---|---|---|
| 6,243,672 B1 * | 6/2001 | Iijima | ..................... | G10L 25/90 704/207 |
| 6,360,271 B1 * | 3/2002 | Schuster | ............... | H04J 3/0632 370/516 |
| 6,512,761 B1 * | 1/2003 | Schuster | ................. | H04L 12/14 370/349 |

(Continued)

FOREIGN PATENT DOCUMENTS

| | | | | |
|---|---|---|---|---|
| EP | 1750397 A1 * | 2/2007 | .......... | G10L 19/005 |
| EP | 1750397 A1 | 2/2007 | | |

(Continued)

OTHER PUBLICATIONS

U.S. Appl. No. 15/720,498, filed Sep. 29, 2017, Kay et al.

(Continued)

*Primary Examiner* — Edwin S Leland, III
(74) *Attorney, Agent, or Firm* — IP Spring

(57) ABSTRACT

Computer-implemented techniques can include establishing, between first and second computing devices, an audio communication session via a network. The first computing device can receive and temporarily store audio packets corresponding to an audio input signal obtained by the second computing device. When the audio packets cause the buffer to fill beyond or at a rate exceeding a loss threshold indicative of a temporary loss of communication via the network, the techniques can decode the audio packets to obtain an audio output signal, determine whether the audio output signal includes speech, and when the audio output signal includes speech, remove a redundant portion of the audio output signal corresponding to a pitch period to obtain a modified audio output signal. The modified audio output signal can then be output via a speaker of the first computing device.

20 Claims, 2 Drawing Sheets

(56) References Cited

U.S. PATENT DOCUMENTS

| | | | |
|---|---|---|---|
| 6,980,528 B1* | 12/2005 | LeBlanc | G10L 25/90 370/286 |
| 7,016,850 B1 | 3/2006 | Cox et al. | |
| 7,099,820 B1 | 8/2006 | Huart et al. | |
| 7,599,399 B1* | 10/2009 | Bugenhagen | H04L 47/10 370/426 |
| 8,532,062 B2* | 9/2013 | Nagasawa | H04L 47/14 370/332 |
| 9,781,209 B2* | 10/2017 | Ergin | H04L 67/1097 |
| 9,900,357 B2* | 2/2018 | Chen | H04L 47/30 |
| 2005/0058145 A1 | 3/2005 | Florencio | G10L 19/005 370/412 |
| 2007/0201656 A1* | 8/2007 | Lakaniemi | G10L 21/04 379/201.01 |
| 2008/0151765 A1* | 6/2008 | Cheruvathery | H04J 3/0632 370/252 |
| 2008/0240004 A1* | 10/2008 | Shaffer | H04J 3/0632 370/296 |
| 2008/0281586 A1 | 11/2008 | Florencio et al. | |
| 2008/0298349 A1* | 12/2008 | Beightol | H04L 29/06027 370/352 |
| 2009/0077254 A1* | 3/2009 | Darcie | H04N 21/4788 709/231 |
| 2011/0002308 A1* | 1/2011 | Nagasawa | H04W 36/0016 370/332 |
| 2011/0044288 A1* | 2/2011 | Nagasawa | H04W 36/26 370/331 |
| 2011/0103377 A1* | 5/2011 | Hua | H04L 65/80 370/352 |
| 2012/0324520 A1* | 12/2012 | Van Deventer | H04L 65/605 725/109 |
| 2014/0172420 A1* | 6/2014 | Taleb | H04J 3/0632 704/211 |
| 2014/0226476 A1* | 8/2014 | Bertze | H04L 47/30 370/230.1 |
| 2016/0105473 A1* | 4/2016 | Klingbeil | H04L 47/2416 370/260 |
| 2016/0267037 A1* | 9/2016 | Kim | G06F 13/385 |
| 2017/0054658 A1* | 2/2017 | Min | H04L 49/70 |
| 2017/0054659 A1* | 2/2017 | Ergin | H04L 67/1097 |
| 2018/0061424 A1* | 3/2018 | Lachapelle | G10L 19/005 |

FOREIGN PATENT DOCUMENTS

| | | | | |
|---|---|---|---|---|
| WO | 2007091206 A1 | | 8/2007 | |
| WO | WO-2007091206 A1 * | | 8/2007 | G10L 21/04 |
| WO | 2013026203 A1 | | 2/2013 | |
| WO | WO-2013026203 A1 * | | 2/2013 | H04J 3/0632 |

OTHER PUBLICATIONS

PCT International Search Report and Written Opinion dated Sep. 27, 2017 for PCT International Application No. PCT/US2017/047090, 11 pages.

PCT International Search Report and Written Opinion dated Oct. 19, 2017 for PCT International Application No. PCT/US2017/048584, 12 pages.

* cited by examiner

AUDIO COMPENSATION TECHNIQUES FOR NETWORK OUTAGES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio communication sessions, such as voice over Internet protocol (VoIP) sessions, can involve two or more users providing audio inputs to their computing devices and the devices exchanging encoded audio packets indicative of the audio inputs via a network. Upon receipt, the audio packets are decoded to obtain an audio signal, which can be output by the receiving computing device via a speaker. Some networks, such as cellular networks, can suffer from network outages. During these network outages, communication via the network is temporarily unavailable.

During these temporary network outages, a large number of audio packets may accumulate, either at an audio communication session buffer of the transmitting computing device as part of the communication session or at a component inside the network (a router, a buffer, a server, etc.). These accumulated audio packets may all then be transmitted together upon reestablishment of communication via the network. This can cause an audio communication session buffer at the receiving computing device to exceed its capacity, which could result in discarding of received audio packets. Missing audio packets will in turn result in gaps in an audio playback, which is undesirable for the listening user.

SUMMARY

A computer-implemented method, a first computing device, and a non-transitory computer-readable medium are presented. The first computing device can include one or more processors and a non-transitory memory storing a set of instructions that, when executed by the one or more processors, causes the first computing device to perform operations. The computer-readable medium can have a set of instructions stored thereon that, when executed by one or more processors of a first computing device, causes the first computing device to perform the operations.

The method and operations can include establishing, between first and second computing devices, an audio communication session via a network; receiving, by the first computing device, audio packets corresponding to an audio input signal obtained by the second computing device; temporarily storing, by the first computing device, the audio packets in a buffer associated with the audio communication session; detecting, by the first computing device, that the audio packets cause the buffer to fill beyond or at a rate exceeding a loss threshold indicative of a temporary loss of communication via the network; in response to the detecting: decoding, by the first computing device, the audio packets to obtain an audio output signal, determining whether the audio output signal includes speech, and when the audio output signal includes speech, removing, by the first computing device, a redundant portion of the audio output signal corresponding to a pitch period to obtain a modified audio output signal; and outputting, by a speaker of the first computing device, the modified audio output signal.

In some embodiments, removing the pitch period from the audio output signal further includes: cross-correlating, by the first computing device, the audio output signal with itself to obtain an autocorrelation signal; and detecting, by the first computing device, a peak of the autocorrelation signal that exceeds a correlation threshold indicative of the pitch period of the audio output signal. In some embodiments, cross-correlating the audio output signal involves normalized cross-correlation, and the correlation threshold is approximately 0.5.

In some embodiments, the method and operations further comprise when the audio output signal does not include speech, removing, by the first computing device, a portion of the audio output signal to obtain the modified output signal. In some embodiments, determining whether the audio output signal includes speech includes applying a voice activity detection (VAD) technique to the audio output signal. In some embodiments, the redundant portion of the audio output signal includes a plurality of consecutive pitch periods. In some embodiments, the audio communication session is a voice over Internet protocol (VoIP) session.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
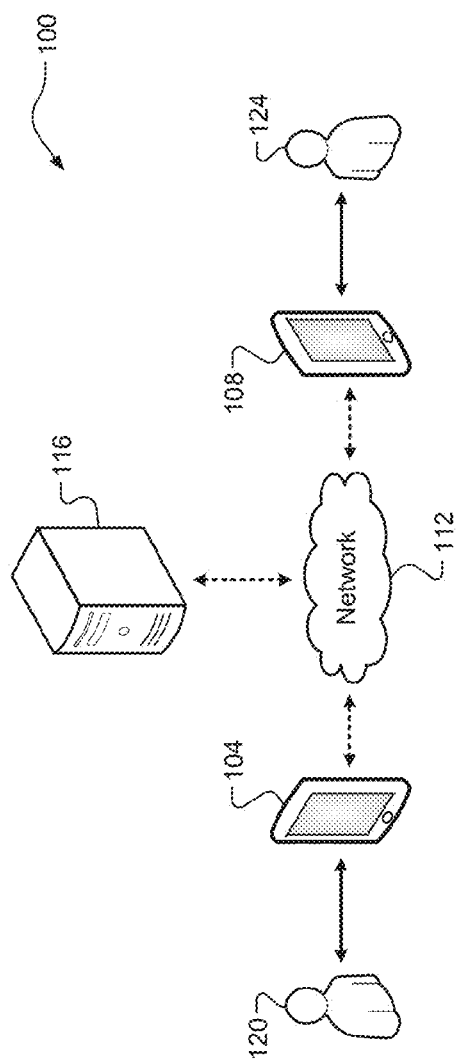
FIG. 1 is a diagram of an example computing network according to some implementations of the present disclosure.

As mentioned above, network outages can cause audio communication session buffers to exceed their capacity (also known as "packet flooding"), which can result in discarded audio packets and gaps in an audio playback for the receiving user. This can be particularly problematic for slow cellular networks, such as early generation cellular networks (e.g., second generation (2G) cellular networks). Acceleration of the audio playback can be performed to compensate for this delay caused by the network outage. Conventional audio playback acceleration, however, can affect the pitch of the audio playback, which is undesirable for the listening user. Accordingly, improved audio compensation techniques for network outages are presented. As part of these improved techniques, a dynamic audio communication session buffer at the receiving device can increase its size to prevent any audio packets received after a temporary network outage from being discarded or otherwise lost.

The term "buffer" as used herein can refer to any data buffer (e.g., a region of physical memory storage) that is used to temporarily store audio data until its output. The phrase "temporary network outage" can refer to a network outage of less than a threshold length. A non-limiting example threshold length could be in a range from a few seconds to less than a minute. A network outage greater than this threshold length could be inappropriate for the techniques of the present disclosure as the audio packet build-up and the resulting delay requiring compensation would be too large.

For audio inputs comprising speech input, compression of the decoded audio signal can be performed by identifying and removing one or more pitch periods. In contrast to accelerated or sped-up playback, this compression can result in a shorter audio output signal which, when played back, can compensate for the delay. For non-speech audio inputs (e.g., background noise), any portion of the decoded audio signal (e.g., not a pitch period) could be removed. The resulting modified audio signal, which can be output via a speaker, also does not have a modified pitch that would be discernable to the listening user. In one implementation, a public switched telephone network (PSTN) could be switched to (e.g., initiated or actively running as a backup) when the temporary network outage occurs. Such a technique, however, may require a larger/higher level audio communication buffer, which could result in delay that may negatively affect the users' conversation.

One technical problem being solved is prevention of dropped/lost audio packets. As mentioned above, some audio packets can be dropped or lost due to temporary network outages that cause the overfilling of audio communication session buffers. The technical advantages of these techniques include not dropping/losing audio packets, which could cause user confusion and could require the users to repeat themselves. Another technical problem being solved is audio synchronization after a delay without affecting the audio pitch. As mentioned above, conventional techniques accelerate audio playback, which affects the pitch and is undesirable to the listening user. The technical advantages of these techniques, therefore, include fast audio playback synchronization after a delay without affecting the audio pitch.

Referring now to FIG. 1, a diagram of an example computing network 100 is illustrated. The computing network 100 can include a first computing device 104 that can communicate with a second computing device 108 via a network 112. While mobile phone configurations of the computing devices 104, 108 are illustrated, it will be appreciated that the first and second computing devices 104, 108 can be any suitable computing devices configured for communication via the network 112 (desktop computers, laptop computers, tablet computers, etc.). The network 112 can be a cellular network (2G, 3G, 4G long term evolution (LTE), etc.), a computing network (local area network, the Internet, etc.), or some combination thereof. A server computing device 116 can also communicate via the network 112. For example, the server computing device 116 could coordinate the audio communication session (e.g., a voice over Internet protocol (VoIP) session) between the first and second computing devices 104, 108. Each of these devices 104, 108, and 116 can be non-transitory storage devices or can include non-transitory storage mediums storing sets of instructions executable by respective processors to perform portions of the techniques of the present disclosure.

This audio communication session could be established, for example, in response to inputs from users 120, 124 at one or both of the first and second computing devices 104, 108. For example, the second user 124 may provide an input at the second computing device 108 to call the first user 120 (an audio communication session request), which could then be accepted by the first user 120 via another input at the first computing device 104, thereby establishing the audio communication session. During the audio communication session, audio packets corresponding to audio inputs (e.g., from users 120, 124) can be exchanged via the server computing device 116 between the first and second computing devices 104, 108. While the first computing device 104 is described as receiving audio data packets from the second computing device 108, it will be appreciated that the first computing device 104 can also transmit audio packets to the second computing device 108.

The term "audio communication session" as used herein can refer to either an audio-only communication session or an audio/video communication session. Further, while the techniques herein are described as being implemented at one of the first and second computing devices 104, 108 that is receiving the audio packets (i.e., the receiving device), it will be appreciated that at least a portion of these techniques could be implemented at the server computing device 116. More particularly, when the server computing device 116 is coordinating the audio communication session, the audio packets can flow through the server computing device 116. Thus, during the temporary network outages, the server computing device 116 could have a queue of audio packets and could perform at least a portion of these techniques, such as decoding, compressing, and then re-encoding for transmission to the receiving device, which could then merely decode and playback upon receipt.

Figure 2:
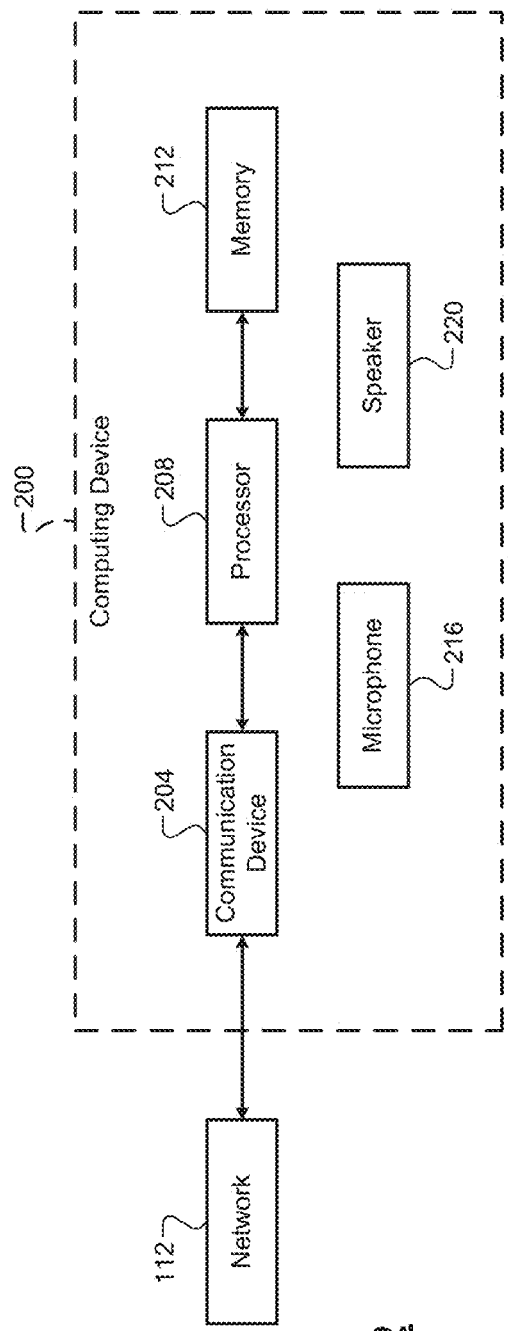
FIG. 2 is a functional block diagram of an example computing device of FIG. 1.

Referring now to FIG. 2, a functional block diagram of an example computing device 200 is illustrated. The computing device 200 can represent the configurations of the first and second computing devices 104, 108. It will be appreciated that the server computing device 116 could also have the same or similar configuration as the computing device 200. The computing device 200 can include a communication device 204 (e.g., a wireless transceiver) configured for communication via the network 112. A processor 208 can be configured to control operation of the computing device 200. The term "processor" as used herein can refer to both a single processor and two or more processors operating in a parallel or distributed architecture. A memory 212 can be any suitable storage medium (flash, hard disk, etc.) configured to store information at the computing device 200. The memory 212 can also include the audio communication session buffer discussed herein. In one implementation, the memory 212 can store instructions executable by the processor 208 to cause the computing device 200 to perform at least a portion of the disclosed techniques.

The computing device 200 can also include a microphone 216 configured to capture audio input and a speaker 220 configured to generate audio output. The microphone 216 can be any suitable acoustic-to-electric transducer or sensor that converts sound into an electrical signal. This can include speech (e.g., by users 120, 124) as well as other noise, such as background noise. The captured audio input (i.e., an analog signal) is then digitized and converted to an audio input signal (i.e., a digital signal). This audio input signal can be encoded into audio packets for transmission via the network 112. Received audio packets can be decoded into an audio output signal. The audio output signal can be provided to the speaker 220, which in turn can produce audible sound corresponding to the audio output signal. The speaker 220 can include a set of electroacoustic transducers that convert an electrical signal into a corresponding sound. While not shown, it will be appreciated that the computing device 200 can include other suitable components, such as a display (a touch display), physical buttons, a camera, and the like.

As previously mentioned herein, when temporary network outages do not cause dropped/discarded audio packets, they may cause audio communication session buffers at the first computing device 104 that are temporarily storing the audio packets to substantially fill or overflow, which can cause audio playback delays (e.g., a few hundred milliseconds). One type of buffer that can be implemented as part of the improved techniques of the present disclosure is a dynamic jitter buffer, which can change its size as needed. Thus, undesirable discarding of overflowed packets (also known as a "buffer flush") at the first computing device 104 may be avoided by increasing the buffer's size after a temporary network outage. To compensate for the built-up quantity of received audio packets at the receiving buffer, playback of the received audio packets by the first computing device 104 can be effectively accelerated (by obtaining a shorter audio output signal) in order to catch up in time to a point where playback would have been but for the temporary network outage. Conventional accelerated playback techniques, however, can affect a pitch of the audio output signal. Thus, the techniques of the present disclosure are directed to accelerating playback in a manner that minimizes undesirable modification of the pitch.

After an audio communication session is reestablished after a temporary network outage, the first computing device 104 can receive a large quantity of audio packets or can receive a set of audio packets at a high rate. In some implementations, the pitch period removal techniques discussed herein can be limited to situations where the collective size of the received and temporarily stored audio packets is greater than a threshold indicative of a temporary loss of communication via the network. In one implementation, the threshold may indicate that the audio communication session buffer (even at its increased size) is almost full, such as greater than 85-95%. This threshold may also be described as being a capacity indicative of a loss of communication via the network 112. In some implementations, the buffer level can also be used to determine how aggressively to apply the accelerated playback techniques. More specifically, if the buffer level is only moderately over the threshold (e.g., 1% over a threshold of 90%), then a higher correlation threshold (see below) can be utilized and only single pitch periods can be removed. If the buffer level is much greater than the threshold (e.g., approximately 100% compared to a threshold of 90%), then a lower correlation threshold (see below) can be utilized and multiple pitch periods (e.g., consecutive pitch periods) can be removed, even at a potential expense of slightly more audible artifacts.

The first computing device 104 can decode the audio packets to obtain an audio output signal. The first computing device 104 can then determine whether the audio output signal includes/contains speech. One example technique for determining whether the audio output signal includes speech is applying a voice activity detection (VAD) technique or another suitable speech detection or speech activity detection technique by which the presence or absence of human speech is detected. It will be appreciated, however, that this determination could be made at the second computing device 108 (on the audio input, prior to encoding/transmission) or at the server computing device 116 (using the audio packets). Whether or not the audio output signal includes speech can affect how the audio output signal is best processed for accelerated playback.

When the audio output signal is determined to include speech, the first computing device 104 can cross-correlate the audio output signal with itself to obtain an autocorrelation signal. Autocorrelation, cross-autocorrelation, and serial correlation all refer to the process of cross-correlating a signal with itself at different temporal points. The autocorrelation signal represents a similarity of samples as a function of a time gap between them and it can be used for identifying the presence of a periodic signal obscured by noise. This similarity of samples can also be indicative of a redundant portion of the signal or, in other words, a portion of the signal that may not be necessary to fully understand the audio represented by the signal. The first computing device 104 can identify a peak in the autocorrelation signal, which represents a strong periodicity in the audio output signal. This peak can be a maximum point in the autocorrelation signal over a particular period. The location of this peak can also represent a redundant portion of the audio input signal corresponding to pitch period of the speech. This identification can be performed, for example using a correlation threshold. For example only, a correlation threshold of approximately 0.5 can be used. The lower threshold, however, increases speed (e.g., up to ~15%) while making little if any difference on the quality of the modified audio output signal.

The first computing device 104 can then remove at least one of the pitch periods from the audio output signal to obtain a modified audio output signal. This process can also include stitching together the previously separate parts of the signal (i.e., that were previously separated by the now-removed pitch period(s)) using a cross-fading technique. Removal of the pitch period shortens the audio output signal, which results in faster playback for resynchronization. The stitching together of the previously separate parts of the signal using the cross-fading technique also avoids an audible noise (e.g., a click) that would be present when playing back the non-stitched together separate parts of the signal. In some implementations, multiple pitch periods could be removed, but the length of the multiple pitch periods could be limited to a certain size (e.g., less than 5-10 milliseconds) to avoid potential buffering problems.

Alternatively, when the audio output signal does not include speech (e.g., when there is no speech and instead only background noise), the first computing device 104 can remove any portion of the audio output signal (e.g., not a pitch period). A portion of the audio output signal that does not include speech does not require a strong correlation for removal because the listener may not care and may not notice the removed noise.

Various combinations of the above could also be implemented: lower correlation threshold only, removal of multiple pitch periods, or both. In certain implementations, the results can include up to 25% increased speed compared to straightforward playback acceleration techniques, while minimizing a negative effect on audio output pitch. In certain implementations, the effective acceleration rate is increased to between 50% and 90%, depending on the audio input signal, which translates to reducing buffer delay by 500 ms to 900 ms per second.

In some implementations, a hold-off time may be implemented between pitch period removal operations. This hold-off time can be used, for example, to prevent unnecessary processing operations, which could save battery life. A non-limiting example of this hold-off time can be from 50-70 milliseconds. In some implementations, this hold-off time could be ignored based on how full the buffer is. In one example embodiment, a turbo playback mode could be initiated when the buffer is more than four times a target upper bound. This turbo playback mode can quickly reduce excessive delay, such as by repeatedly removing as many pitch periods as possible during a particular period (e.g., 10-20 milliseconds) and without using the hold-off time. It will be appreciated that one or both of the basic pitch period removal and turbo playback mode techniques discussed herein could be manually enabled/disabled by a user of the corresponding device.

Figure 3:
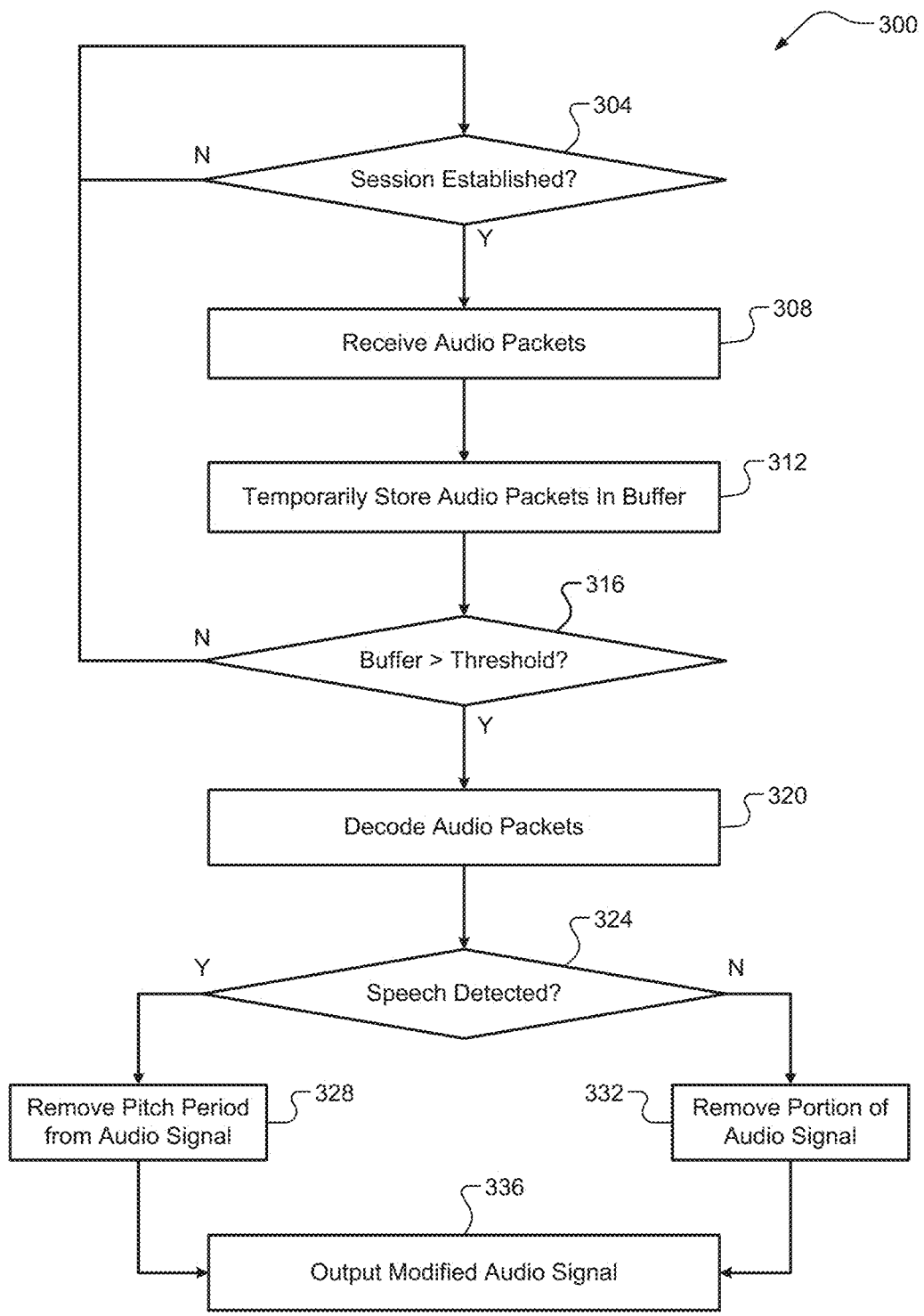
FIG. 3 is a flow diagram of an example audio compensation technique for network outages according to some implementations of the present disclosure.

Referring now to FIG. 3, a flow diagram of an example audio compensation technique 300 for network outages is illustrated. At 304, an audio communication session between the first and second computing devices 104, 108 can be established via the network 112. For example, the audio communication session may be established and coordinated by the server computing device 116. At 308, the first computing device 104 can receive audio packets corresponding to an audio input signal obtained by the second computing device 108. At 312, the first computing device 104 can temporarily store the received audio packets in the buffer. For example, at least some of these audio packets may correspond to an audio input captured at the second computing device 108 during the temporary network outage. Pre-outage audio packets, however, may also be received. At 316, the first computing device 104 can determine whether the audio packets cause the audio communication session buffer to fill beyond or at a rate exceeding a loss threshold indicative of a temporary network outage. If true, the technique 300 could proceed to 320. If false, the technique 300 could end or proceed to 340 where the audio packets are decoded and output in a conventional manner.

At 320, the first computing device 104 can decode the audio packets to obtain an audio output signal. At 324, the first computing device 104 can determine whether the audio output signal contains speech. For example, VAD could be performed on the audio output signal to make this determination. If it is determined that the audio output signal contains speech, the technique 300 can proceed to 328. If it is determined that the audio output signal does not include speech, the technique 300 can proceed to 332. At 328, the first computing device 104 can compress the audio output signal by removing a pitch period therefrom to obtain a modified audio output signal. The technique 300 can then proceed to 336. At 332, the first computing device 104 can compress the audio output signal by removing a portion of the audio output signal to obtain the modified output signal. The technique can then proceed to 336. At 336, the first computing device 104 can output the modified audio output signal and the technique 300 can end or return to 304 or 308.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   establishing, between first and second computing devices, an audio communication session via a network;
   receiving, by the first computing device, audio packets corresponding to an audio input signal obtained by the second computing device;
   temporarily storing, by the first computing device, the audio packets in a dynamic jitter buffer associated with the audio communication session;
   detecting, by the first computing device, that the audio packets cause the dynamic jitter buffer to fill at a rate exceeding a loss threshold indicative of a temporary network outage, wherein the temporary network outage is within a range from two or more seconds to less than one minute;
   in response to the detecting:
      increasing a size of the dynamic jitter buffer after the temporary network outage,
      decoding, by the first computing device, the audio packets to obtain an audio output signal,
      determining whether the audio output signal includes speech, and
      when the audio output signal includes speech, removing, by the first computing device, a redundant portion of the audio output signal corresponding to a pitch period to obtain a modified audio output signal; and
   outputting, by a speaker of the first computing device, the modified audio output signal.

2. The computer-implemented method of claim 1, wherein removing the pitch period from the audio output signal further includes:
   cross-correlating, by the first computing device, the audio output signal with itself to obtain an autocorrelation signal; and
   detecting, by the first computing device, a peak of the autocorrelation signal that exceeds a correlation threshold indicative of the pitch period of the audio output signal.

3. The computer-implemented method of claim 1, further comprising when the audio output signal does not include speech, removing, by the first computing device, a portion of the audio output signal to obtain the modified output signal.

4. The computer-implemented method of claim 1, wherein determining whether the audio output signal includes speech includes applying a voice activity detection (VAD) technique to the audio output signal.

5. The computer-implemented method of claim 1, wherein the redundant portion of the audio output signal corresponds to a plurality of consecutive pitch periods.

6. The computer-implemented method of claim 1, wherein the audio communication session is a voice over Internet protocol (VoIP) session.

7. The computer-implemented method of claim 1, wherein a buffer level of the dynamic jitter buffer is used to determine a quantity of the redundant portion of the audio output signal to be removed.

8. A first computing device having one or more processors and a non-transitory memory storing a set of instructions that, when executed by the one or more processors, causes the first computing device to perform operations comprising:
 establishing an audio communication session with a second computing device via a network;
 receiving audio packets corresponding to an audio input signal obtained by the second computing device;
 temporarily storing the audio packets in a dynamic jitter buffer associated with the audio communication session;
 detecting that the audio packets cause the dynamic jitter buffer to fill at a rate exceeding a loss threshold indicative of a temporary network outage, wherein the temporary network outage is within a range from two or more seconds to less than one minute;
 in response to the detecting:
  increasing a size of the dynamic jitter buffer after the temporary network outage,
  decoding the audio packets to obtain an audio output signal,
  determining whether the audio output signal includes speech, and
  when the audio output signal includes speech, removing a redundant portion of the audio output signal corresponding to a pitch period to obtain a modified audio output signal; and
 outputting, by a speaker of the first computing device, the modified audio output signal.

9. The first computing device of claim 8, wherein removing the pitch period from the audio output signal further includes:
 cross-correlating the audio output signal with itself to obtain an autocorrelation signal; and
 detecting a peak of the autocorrelation signal that exceeds a correlation threshold indicative of the pitch period of the audio output signal.

10. The first computing device of claim 8, wherein the operations further comprise when the audio output signal does not include speech, removing a portion of the audio output signal to obtain the modified output signal.

11. The first computing device of claim 8, wherein determining whether the audio output signal includes speech includes applying a voice activity detection (VAD) technique to the audio output signal.

12. The first computing device of claim 8, wherein the redundant portion of the audio output signal includes a plurality of consecutive pitch periods.

13. The first computing device of claim 8, wherein the audio communication session is a voice over Internet protocol (VoIP) session.

14. The first computing device of claim 8, wherein the operations further comprise in response to the detecting, determining a buffer level of the dynamic jitter buffer and responsive to the buffer level being within a predetermined percentage of the loss threshold, the pitch period is a single pitch period that is removed.

15. A non-transitory computer-readable medium having a set of instructions stored thereon that, when executed by one or more processors of a first computing device, causes the first computing device to perform operations comprising:
 establishing an audio communication session with a second computing device via a network;
 receiving audio packets corresponding to an audio input signal obtained by the second computing device;
 temporarily storing the audio packets in a dynamic jitter buffer associated with the audio communication session;
 detecting that the audio packets cause the dynamic jitter buffer to fill at a rate exceeding a loss threshold indicative of a temporary network outage, wherein the temporary network outage is within a range from two or more seconds to less than one minute;
 in response to the detecting:
  increasing a size of the dynamic jitter buffer after the temporary network outage,
  decoding the audio packets to obtain an audio output signal,
  determining whether the audio output signal includes speech, and
  when the audio output signal includes speech, removing a redundant portion of the audio output signal corresponding to a pitch period to obtain a modified audio output signal; and
 outputting, by a speaker of the first computing device, the modified audio output signal.

16. The computer-readable medium of claim 15, wherein removing the pitch period from the audio output signal further includes:
 cross-correlating the audio output signal with itself to obtain an autocorrelation signal; and
 detecting a peak of the autocorrelation signal that exceeds a correlation threshold indicative of the pitch period of the audio output signal.

17. The computer-readable medium of claim 15, wherein the operations further comprise when the audio output signal does not include speech, removing a portion of the audio output signal to obtain the modified output signal.

18. The computer-readable medium of claim 15, wherein determining whether the audio output signal includes speech includes applying a voice activity detection (VAD) technique to the audio output signal.

19. The computer-readable medium of claim 15, wherein the redundant portion of the audio output signal includes a plurality of consecutive pitch periods.

20. The computer-readable medium of claim 15, wherein a buffer level of the dynamic jitter buffer is used to determine a quantity of the redundant portion of the audio output signal to be removed.

* * * * *